United States Patent [19]
Boltrek et al.

[11] Patent Number: 4,576,276
[45] Date of Patent: Mar. 18, 1986

[54] ESCALATOR

[75] Inventors: Henry Boltrek, Freeport, N.Y.; Peter J. Coakley, Jr, Hackettstown, N.J.

[73] Assignee: Westinghouse Electric Corp., Pittsburgh, Pa.

[21] Appl. No.: 618,842

[22] Filed: Jun. 8, 1984

[51] Int. Cl.⁴ .............................................. B65G 23/12
[52] U.S. Cl. ..................................... 198/332; 198/329; 198/838
[58] Field of Search ............... 198/329, 332, 813, 814, 198/815, 838; 403/147, 148, 149; 238/228

[56] References Cited

U.S. PATENT DOCUMENTS 1,043,542 11/1912 Seeberger .......................... 198/332
1,682,014 8/1928 Margles et al. ................ 198/329 X
1,868,780 7/1932 Valtier .
3,365,051 1/1968 Mullis et al. .
3,419,127 12/1968 Yost .
3,677,388 7/1972 Boltrek et al. ...................... 198/330
4,130,192 12/1978 Kraft .
4,381,851 5/1983 Kraft .................................. 198/329

*Primary Examiner*—Joseph E. Valenza
*Assistant Examiner*—D. Glenn Dayoan
*Attorney, Agent, or Firm*—D. R. Lackey

[57] ABSTRACT

An escalator having a conveyor constructed of rigid, pivotally interconnected toothed links, step axles, steps on the step axles, axle rollers on the axles, and step rollers on the steps. The guide arrangement for the conveyor includes a truss having axle and step roller guides. The guide portion of the truss includes movable, free-floating, self-adjusting, upper and lower turn-arounds guided for rectilinear movement, and a fixed intermediate portion. Sliding joints which permit misalignment without binding interconnect the movable and fixed portions of the axle and step roller guides.

5 Claims, 6 Drawing Figures

ESCALATOR

BACKGROUND OF THE INVENTION

1. Field of the Invention

The invention relates in general to escalators, and more specifically to escalators of the type in which the conveyor portion is constructed of pivotally interconnected, rigid, toothed links.

2. Description of the Prior Art

A conventional step chain for an escalator driven by a large sprocket wheel normally located at the upper end of the conveyor run has several pitches between the axles to which the steps are attached. The bottom sprocket is biased to tension the chain and accommodate lengthening of the chain due to wear. If this conventional step chain wears more on one side than on the other side, there is no problems, as the chain is flexible and cannot take compressive loads.

U.S. Pat. Nos. 3,677,388; 3,682,289 and 3,707,220, which are assigned to the same assignee as the present application, disclose an escalator in which the conveyor belt is constructed of first and second loops, with each loop being constructed of pivotally interconnected rigid toothed links. Step axles join the two loops, each coaxial with a pivot axis. One or more modular drive units, located in the inclined portion of the truss, engage the toothed links on both the upper and lower runs of the conveyor to drive the conveyor in its endless loop. This will be referred to hereinafter as the modular drive chain. A significant advantage of the modular drive chain over the prior art step chain is a substantial reduction in load on the working parts, regardless of rise. The rigid links correctly space the step axles, eliminating the chain tensioning devices of the prior art.

A belt or chain constructed of pivotally interconnected rigid links, with one link between adjacent axles, can create vibration and noise when the link bushings wear. The modular chain or conveyor belt lengthens and pumps energy into the truss at the guide portions of the turn arounds, as the axle rollers transfer between the guide surfaces of the upper and lower runs. U.S. Pat. No. 4,130,192, which is assigned to the same assignee as the present application, discloses an automatic adjustment of the guide track for the axle rollers in the turnarounds. The ends of the curved guide tracks which proceed from the upper and lower runs are pivoted, and the adjacent free ends of the curved guide tracks are pivotally interconnected via a member which translates the movement of one curved guide track to the other. The arrangement requires initial adjustment of the turnarounds to the adjustment range of the cooperative guide track structure. Periodic readjustment may be required to maintain the effectiveness of the arrangement, as the link bushings wear.

If the wear of the modular drive chain should be unequal between the two sides thereof, the chain, being capable of taking compressive loads, can transmit loads into the steps during the turnarounds, which can also cause vibration, noise and undue wear.

SUMMARY OF THE INVENTION

Briefly, the present invention is a new and improved escalator of the type in which the conveyor includes first and second spaced loops constructed of rigid, pivotally interconnected toothed links. Step axles, having axle rollers on their ends, interconnect the spaced loops. Steps, which include step rollers, are attached to the step axles. A guide arrangement, which guides the conveyor in an endless loop, includes a truss having axle roller guides and step roller guides. The guide portion of the truss has movable, free-floating, self-adjusting, upper and lower turnarounds guided for horizontal rectilinear movement, and a fixed intermediate portion which includes the incline. Sliding joints, which permit mis-alignment without binding, interconnect the movable and fixed portions of the step and axle roller guides. One or more drives mounted in the truss engage teeth of the toothed links to drive the conveyor in its endless loop which includes an upper load bearing portion and a lower return run. The forces in the conveyor, the length of the conveyor, and the distance between the pivot axes of adjacent toothed links all cooperate to correctly position each turnaround at any instant in time, eliminating initial as well as subsequent adjustment of the turn arounds, while enabling the turnarounds to continually seek the position of least resistance. Thus, noise, vibration and excessive wear due to normal wear of the link bushings is eliminated or substantially reduced. The step guides in the turn arounds are free to move relative to the axle guides, preventing forces from building up in the steps while they move through the turnarounds, thus eliminating or substantially reducing vibration, noise and excessive wear caused by unequal wear of the two sides of the modular chain.

In addition to eliminating initial and subsequent adjustments, automatically providing the correct position of the guides in the turnarounds, and automatically providing the correct positions of the axle and step roller guides relative to one another in the turnarounds, the freely positioned turnarounds will automatically accommodate the changing forces in the modular belt or chain due to load, and due to the spring mounting of plural modular drive units, as disclosed in copending application Ser. No. 532,438, filed Sept. 15, 1983, entitled "Escalator".

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
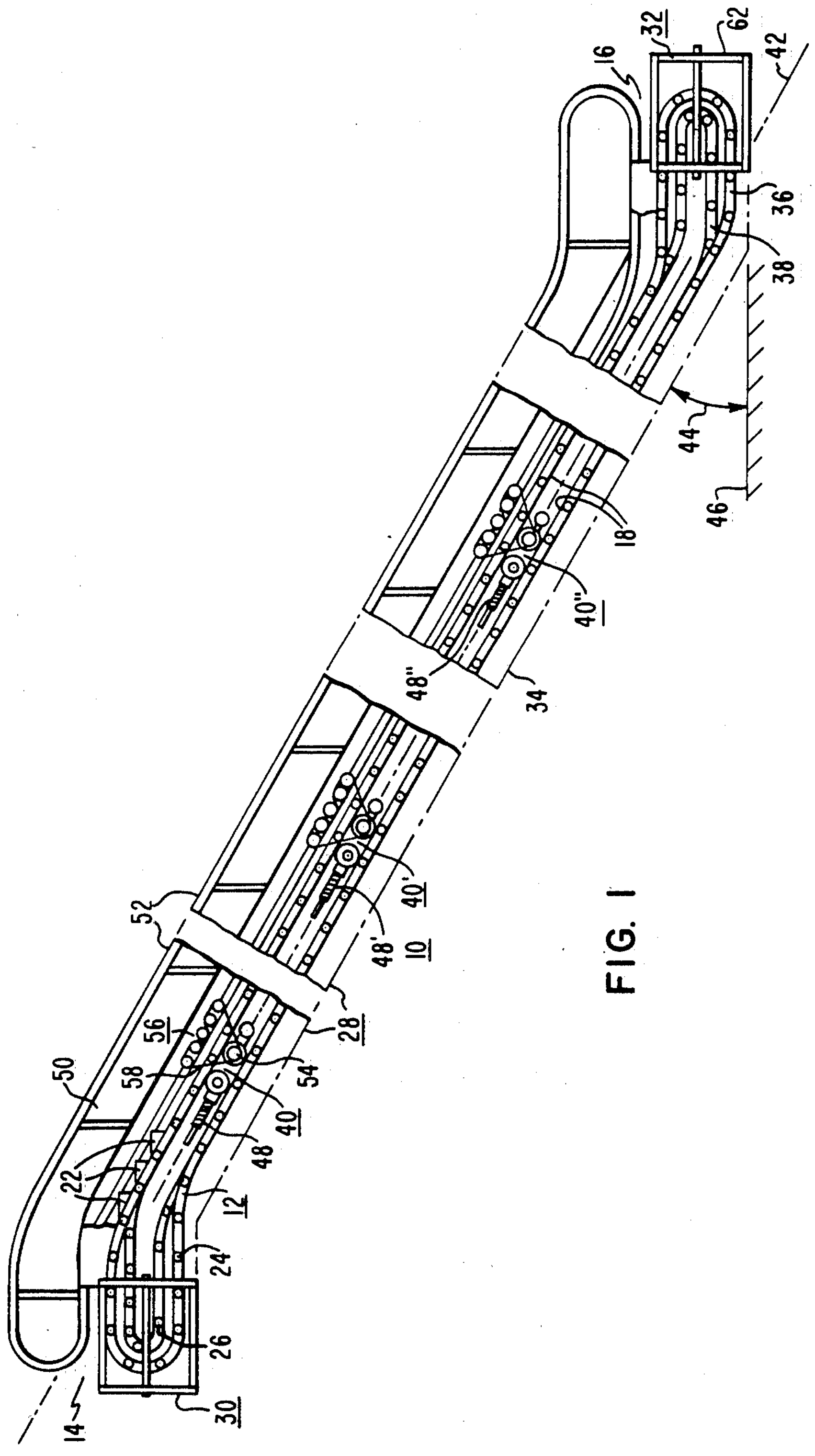
FIG. 1 is an elevational view of an escalator constructed according to the teachings of the invention.

Referring now to the drawings, and to FIG. 1 in particular, there is shown an escalator 10 of the type which may utilize the teachings of the invention. Escalator 10 may have a single modular drive unit, or multiple drive units, as shown, depending upon rise. Escalator 10 may have rigidly mounted drive units, or resiliently mounted drive units, as illustrated. Suitable modular drive units, the modules for accepting the drive units, and arrangements for resiliently mounting the drive units, are fully disclosed in the hereinbefore-mentioned U.S. Pat. Nos. 3,677,388 and 3,707,220, and in the hereinbefore-mentioned co-pending application Ser. No. 532,438. Accordingly, these patents and patent application are hereby incorporated into the present application by reference, and the description of escalator 10 will be directed to the elements which are important to the present invention.

More specifically, escalator 10 includes a conveyor or belt portion 12 for transporting passengers between a first or upper landing 14 and a second or lower landing 16. Conveyor 12 is of the endless articulated type, which is driven about a closed path or loop. As disclosed in detail in the incorporated U.S. Pat. No. 3,677,388, the endless flexible conveyor 12 has first and second sides, each of each are formed of rigid, pivotally interconnected toothed step links 18. The two sides of the conveyor 12 are interconnected by step axles 20, best shown in FIGS. 2 and 3, which extend through link bushings, such as the bushings shown in U.S. Pat. No. 4,232,783 or in copending application Ser. No. 493,899 filed May 12, 1983. Thus, the pivot axes are coaxial with the longitudinal axes of the axles 20. Steps 22 are connected to the step axles, such as by the arrangement set forth in U.S. Pat. No. 3,798,972. The above-mentioned patents and patent application are assigned to the same assignee as the present application.

Axle wheels or rollers 24 are mounted on the ends of the steps axles 20, and a pair of step wheels or rollers 26 are mounted on each step 22.

Conveyor 12 is supported and guided by a guide arrangement which includes a truss 28 having a structural portion and a guide portion. Truss 28 includes upper and lower turnarounds 30 and 32, respectively, shown in solid, and an inclined intermediate portion 34 shown in phantom. The guide portion of truss 28 includes axle roller guide tracks 36 and step roller guide tracks 38.

As will be hereinafter described in detail, the guide portions of the upper and lower turnarounds 30 and 32 are each mounted for horizontal rectilinear movement, relative to the guide portion of the intermediate section 34 of the truss 28, with the axle and step roller guides 36 and 38 including sliding joints, shown in detail in FIGS. 2 through 6, which provide a smooth transition for the axle and guide rollers, and which are non-binding, even when the fixed and movable portions of the associated guides are not in exact alignment.

Conveyor 12 is driven by one or more modular drive units, depending upon rise, with first, second and third modular drive units 40, 40' and 40'', respectively, being shown in FIG. 1 for purposes of example. The drive units are supported by the inclined portion 34 of the truss 28, with the uppermost drive unit 40 being mounted just below the transition between the horizontal landing portion and the inclined section. The longitudinal axis 42 of the inclined portion or section 34 of truss 28 makes an angle 44, such as 30°, with a horizontal plane 46.

When multiple drive units are utilized, as illustrated, they may be rigidly mounted to truss 28, or as illustrated in FIG. 1, they may be resiliently mounted to the truss 28 by resilient mounting means 48, 48' and 48''. The invention provides advantages for either the rigid or resilient mounting arrangement, providing additional advantages for escalators having resiliently mounted drives as it automatically compensates for drive movement and the localized changes in the length of the modular drive chain due to load induced compression and tension.

A balustrade 50, which guides a continuous flexible handrail 52, completes escalator 10. A handrail drive pulley 54 on the modular drive units is linked to a handrail drive 56 via a suitable chain or belt 58.

Figure 2:
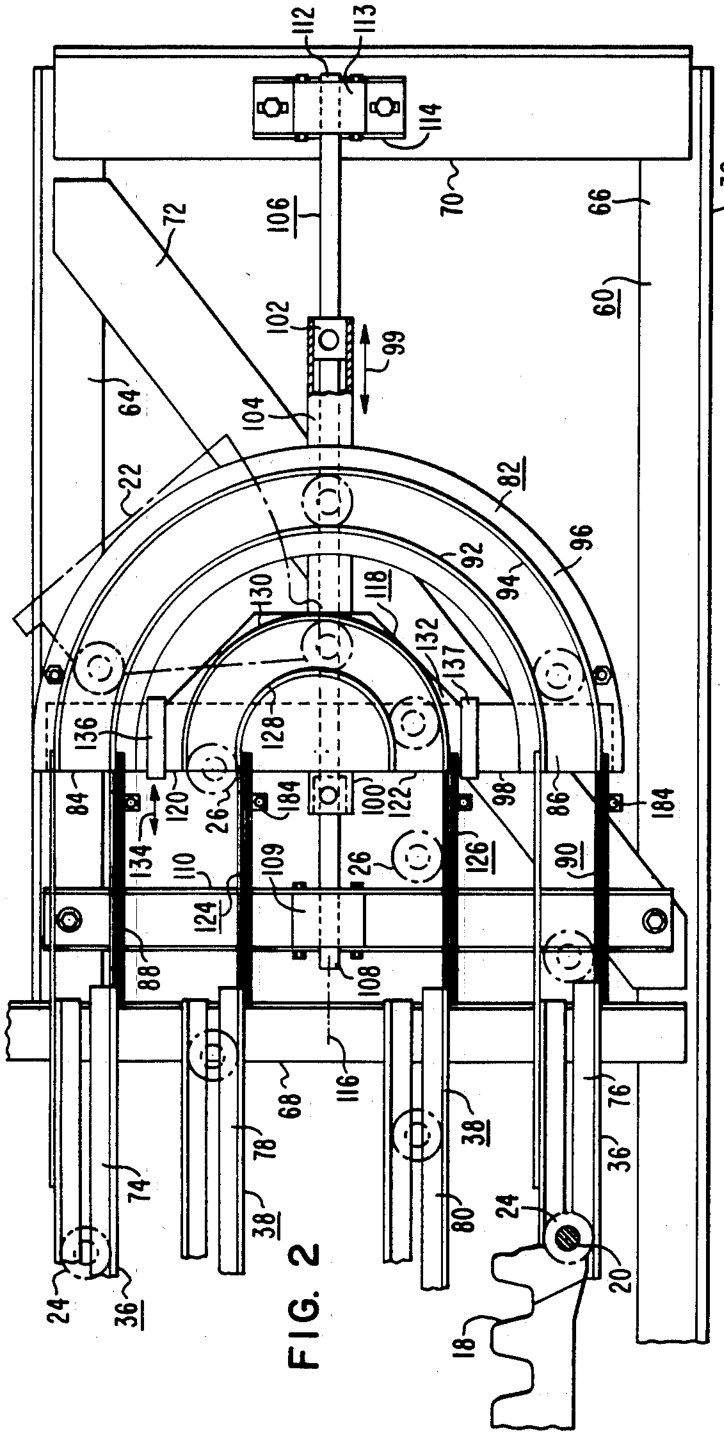
FIG. 2 is an enlarged elevational view illustrating one side of the lower turnaround of the escalator shown in FIG. 1.
Figure 3:
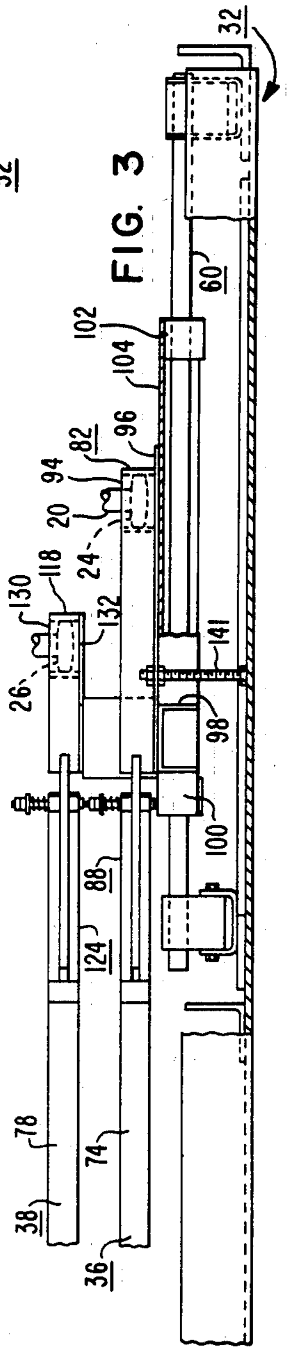
FIG. 3 is a plan view of the turnaround shown in FIG. 2.

FIG. 2 is an elevational view of the lower turnaround 32. Turnaround 32 includes first and second similar sides, i.e., right and left-hand sides 60 and 62 when viewing the lower turnaround 32 from the lower entrance to the escalator 10, with FIG. 2 being an elevational view of the right-hand side 60 when viewed from the left-hand side. The left-hand side 62, shown in FIG. 1, is similar to the construction of the right-hand side, and the upper turnaround 30 is similar in construction to the lower turnaround 32, and thus the similar items are not illustrated in detail.

The right-hand side 60 of the lower turnaround 32 includes a fixed structural arrangement which is part of the structural portion of truss 28. The fixed structural arrangement includes upper and lower longitudinal angle or truss members 64 and 66, vertical truss members 68 and 70, and a diagonal truss member 72.

The axle roller guide 36 includes fixed upper and lower portions 74 and 76, respectively, and the step roller guide 38 includes fixed upper and lower portions 78 and 80, all of which are suitably attached to templates (not shown) which extend at spaced intervals between the right and left-hand portions of the truss 28.

The axle roller guide 36 includes a movable curved guide section 82 having upper and lower ends 84 and 86, respectively. The upper end 84 joins the fixed upper portion 74 via a sliding joint 88, and the lower end 86 joins the fixed lower portion 76 of the actual roller guide 36 via a sliding joint 90.

The curved axle roller guide section 82 includes first and second curved sections 92 and 94 spaced to guide the OD of the axle rollers 24, with sections 92 and 94 being fixed to a flat mounting plate 96 having an arcuate configuration, with a stiffening channel member 98 being attached to the two ends of the configuration. The curved configuration of sections 92 and 94 is generated according to the exact path of the spaced axle rollers as they make the transition between the load bearing and return runs.

The curved guide section 82 is mounted for free, horizontal, rectilinear movement, indicated by double-headed arrow 99, within the structural portion of the lower turnaround 32. For example, the guide section 82 may be mounted on rollers which cooperate with straight guide tracks; or as illustrated, the guide section 82 may have a pair of spaced bearing blocks 100 and 102 attached to plate 96 and to stiffening member 98 via a channel member 104. The bearing blocks 100 and 102 smoothly and freely slide on a straight rod 106 which is fixed to the structural portion of the lower turnaround 32. For example, a first end 108 of rod 106 may be fixed via an arrangement 109 to a channel member 110 which extends between the horizontal truss members 64 and 66. A second end 112 of rod 106 may be fixed, via a mounting arrangement 113, to a channel member 114 suitably attached to the vertical truss member 70. The longitudinal axis 116 of rod 106 is aligned parallel with the horizontal plane 46 (FIG. 1).

The step roller guide 38 includes a movable curved guide section 118 having upper and lower ends 120 and 122, respectively. The upper end 120 joins the fixed upper portion 78 of the stepped guide 38 via a sliding joint 124, and the lower end 122 joins the fixed lower portion 80 of the stepped roller guide 38 via a sliding joint 126.

The curved guide section 118 includes first and second curved guide members 128 and 130 spaced to guide the OD of the step roller 26, with the members 128 and 130 being fixed to a flat mounting plate 132. The curved configurations of members 128 and 130 are portions of a true circle.

The guide section 118 is guided for free, horizontal, rectilinear movement, indicated by double-headed arrow 134, within upper and lower guides 136 and 137, respectively, which slidably receive upper and lower edges of plate 132. The upper and lower guides 136 and 137 are also mounted for free, horizontal rectilinear movement, being fixed to the channel 98 which moves with the curved axle guide 82. Any tendency of the movable guide portion of the lower turnaround 32 to twist or tip may be prevented by attaching a bolt 141 to plate 96, the head of which is adjusted to smoothly slide on a structural portion of the truss 28.

Figure 4:
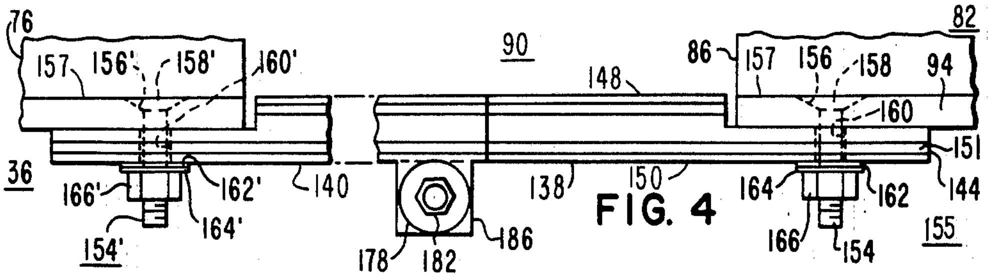
FIG. 4 is an enlarged fragmentary view of one end of a non-binding sliding joint shown in FIG. 1.
Figure 5:
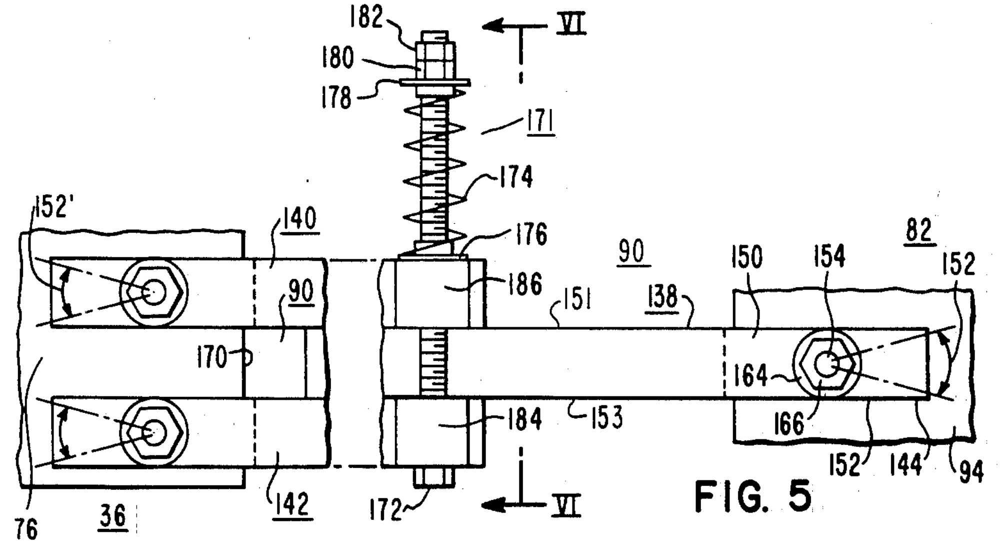
FIG. 5 is a bottom view of the sliding joint shown in FIG. 4.
Figure 6:
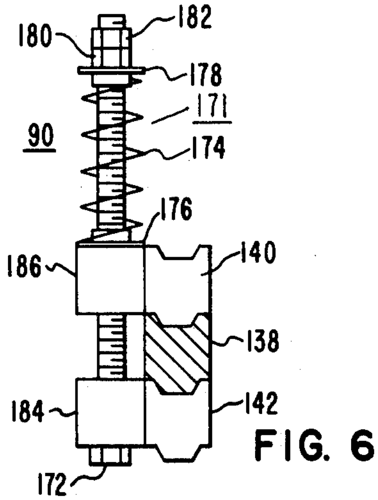
FIG. 6 is a cross-sectional view of the sliding joint shown in FIG. 1, taken between and in the direction of arrows VI—VI.

FIG. 4 is an enlarged elevational view of sliding joint 90 which interconnects the fixed and movable portions 76 and 82, respectively, of the axle roller guide 36. FIG. 5 is a bottom view of sliding joint 90, and FIG. 6 is a cross-sectional view of sliding joint 90, taken between and in the direction of arrows VI—VI in FIG. 5. Sliding joint 90 is similar in construction to sliding joints 88, 124 and 126, and thus, the similar joints are not shown in detail.

More specifically, sliding joint 90 includes first, second and third elongated, metallic finger members 138, 140 and 142, respectively. The finger members may all have a like cross-sectional configuration, and thus they may all be cut from the same bar. Finger member 138 has first and second ends, such as end 144, a wheel support surface 148 which extends in a direction between its ends, an opposing surface 150, and first and second side portions 151 and 153, respectively. The side portions are cooperatively configured to nest when like oriented fingers are placed in contacting side-by-side relation. As illustrated, side portions 151 and 153 are preferably formed with a groove and a tongue, respectively, configured and dimensioned such that the tongue on one finger member will snugly enter the groove on an adjacent finger member, allowing slidable relative movement between them in a direction between the ends of the finger members, but resisting relative movement in any other direction.

Finger member 138 is fixed to curved track section 94 such that the wheel support surface of finger member 138 is in the same plane as the wheel support surface 157 of track section 94, with finger 138 extending outwardly from end 86. Finger member 138 is placed relative to the width dimension of track section 94 such that a line drawn on support surface 148 of finger member 138, between its ends, along the mid-point of the surface, will coincide with he mid-point of the tread of a wheel or roller 24 which will roll on the track section. In order to orient wheel support surfaces 157 and 148 of track section 94 and finger member 136, respectively, in a common plane, a portion of finger member 138 is removed at end 144 for a depth equal to the thickness dimension of track section 94. As illustrated in FIG. 4, the upper surface of the cut-away portion is placed against the bottom surface of track section 94, and finger 138 is secured to guide track section 94 via an arrangment 155 which permits misalignment between the guide tracks being joined without binding, such as a $\pm 3°$ misalignment, indicated by angle 152 in FIG. 5. Arrangement 155, for example, may include a flat-headed bolt 154, an opening 156 in track 94 for snugly receiving the head 158 and shank portion of bolt 154, while recessing the head below the guide surface, an oversize hole 160 in finger 138 for receiving bolt 154, a washer 162, a lock washer 164, and a nut 166. The oversize hole 160 permits the finger members to be correctly assembled, notwithstanding misalignment of the guide portions being joined by the sliding joint.

In like manners, finger members 140 and 142 are fixed to track section 76 such that their wheel support surfaces are in the same plane as the wheel support surface 157 of track section 76, with finger members 140 and 142 extending outwardly from end 170 of track section 76. Finger members 140 and 142 are disposed in spaced parallel relation such that finger member 138 may snugly but slidably enter the space between them. The adjacent contacting surfaces of the finger members are resiliently clamped together by resilient clamping means 171.

Clamping means 171, best shown in FIG. 6, maintains alignment of the fingers 138, 140 and 142 while allowing the requisite sliding joint action. Clamping means 171, by adding some friction which must be overcome in order to move the turnaround, also prevents oscillation of the turnaround which a substantially friction-free arrangement might promote as the links 18 pass through the turnaround at a predetermined rhythmic rate.

The resilient biasing together of the fingers 138, 140 and 142 may be provided by a bolt 172, spring 174, spring seats 176 and 178, nuts 180 and 182, and mounting lugs 184 and 186. The mounting lugs 184 and 186 are secured to the spaced finger members 142 and 140, respectively, such as by welding, with the mounting lugs 184 and 186 having axially aligned openings for receiving bolt 172. After bolt 172 is inserted through the aligned openings, spring seat 176, spring 174, spring seat 178, and nuts 180 and 182 are applied to the bolt in the recited order. Nut 180 is turned to provide the desired compression of spring 174, and nut 182 functions as a jam nut to hold the selected spring compression.

In summary, there has been disclosed a new and improved escalator of the type having a modular drive chain formed of pivotally interconnected, rigid toothed links, and one or more modular drive units disposed in the incline of the truss which engage the links to drive the conveyor portion of the escalator. Initial adjustment, as well as subsequent adjustment, of the turnarounds, is eliminated by constructing the guide portions of the turnaround such that they are free to move rectilinearly and horizontally under the influence of the modular drive chain as it passes through the turnarounds. The axle rollers of the modular drive chain position the axle roller turnaround guide, carrying with it the horizontally adjustable guides for the step roller turnaround guide. Thus, in addition to reducing vibration, noise, and undue wear of the escalator due to compression and tensile loading of the modular chain, wear of the link bushings, and spring loading of plural modular drive units, it also reduces vibration, noise and undue wear due to uneven wear of the two sides of the modular drive belt. As hereinbefore stated, uneven wear tends to apply a load to the escalator steps in the turnarounds, which in turn applies load to the turnaround guides. The freedom of the step roller turnaround guide to move relative to the axle roller turnaround guide prevents such loading of the escalator steps. Sliding joints interconnect the stationary and movable guide portions, which are constructed to operate without binding, even when the two sections that are interconnected by the sliding joint are not precisely aligned.

We claim as our invention:

1. An escalator, comprising:

a conveyor having first and second spaced loops constructed of pivotally interconnected, rigid, toothed links, step axles interconnecting said first and second loops, axle rollers on said step axles, steps connected to said step axles, step rollers on said steps, a guide arrangement for guiding said conveyor in an endless loop including a truss having axle roller guides and step roller guides, drive means mounted in said truss, said drive means engaging toothed links of said conveyor, said truss having movable, free floating, self-adjusting, upper and lower turnaround guide portions mounted for rectilinear movement, and a fixed intermediate guide portion, and non-binding sliding joints in the axle and step roller guides, between the fixed and movable guide portions of said truss, said self-adjusting upper and lower turnaround guide portions each including first mounting means and axle roller guide tracks, said axle roller guide tracks being fixed to said first mounting means, said first mounting means being rectilinearly adjusted by said axle rollers in response to positioning forces in said conveyor, said self-adjusting upper and lower turnaround guide portions further including second mounting means and step roller guide tracks, said second mounting means being fixed to said first mounting means such that rectilinear movement of said first mounting means also adjusts the position of said second mounting means, said step roller guide tracks being mounted for rectilinear movement relative to said second mounting means, such that positioning forces in the step rollers and associated steps independently position said step roller guide tracks relative to said axle roller guide tracks, whereby the step and axle roller guide portions of the upper and lower turnaround guide portions are each free to move independently to positions of least resistance in response to instantaneous forces in the conveyor and steps.

2. The escalator of claim 1 wherein each turnaround includes first and second sides each having axle and step guide tracks for the first and second loops, respectively, of toothed links, with said first and second sides each being independently movable and free-floating.

3. The escalator of claim 1 wherein each non-binding sliding joint includes interleaved fingers and a spring disposed to resiliently bias said fingers together, perpendicular to their longitudinal dimensions.

4. The escalator of claim 1 wherein the non-binding sliding joints include:

interleaved fingers each having free ends and fixed ends, means for mounting said fixed ends to accommodate misalignment between the movable and fixed portions of the axle and step roller guides without binding, said means for mounting the fixed ends of said interleaved fingers each including a bolt, and first and second aligned openings for receiving said bolt in the fixed end of a finger and associated guide portion to be joined thereto, respectively, with the diameter of said first opening exceeding the diameter of said second opening to accommodate assembly of said finger members notwithstanding misalignment between the guide portions being joined by the associated sliding joint, and spring means resiliently biasing the interleaved fingers together.

5. The escalator of claim 1 wherein the drive means includes at least two drive units, and including bias means for resiliently mounting the drive units in the truss, with said bias means biasing said drive means in a direction parallel with the movement of the toothed links in the intermediate guide portion of the truss.

* * * * *